United States Patent [19]

Tessner

[11] 4,038,962

[45] Aug. 2, 1977

[54] AUTOMATIC POWER CONTROLLER FOR A WIRE SAW

[75] Inventor: Roy Lynnard Tessner, Atlanta, Ga.

[73] Assignee: Coggins Industries, Inc., Elberton, Ga.

[21] Appl. No.: 717,642

[22] Filed: Aug. 25, 1976

[51] Int. Cl.² ............................................. B28D 1/08
[52] U.S. Cl. .................................................... 125/21
[58] Field of Search ...................... 51/165.92, 165 R; 125/21, 12

[56] References Cited

U.S. PATENT DOCUMENTS

| | | | |
|---|---|---|---|
| 2,674,238 | 4/1954 | Dessureau | 125/21 |
| 2,958,323 | 11/1960 | Knoph | 125/21 |
| 2,961,808 | 11/1960 | Dunigan | 51/165.92 |
| 3,635,207 | 1/1972 | Grage | 125/21 |
| 3,948,001 | 4/1976 | Miyazawa | 51/165.92 |

FOREIGN PATENT DOCUMENTS 1,291,784   3/1962   France .................................. 125/21

Primary Examiner—Harold D. Whitehead
Attorney, Agent, or Firm—Newton, Hopkins & Ormsby

[57] ABSTRACT

To maintain the cutting wire of a wire saw properly bowed with a substantially constant cutting pressure on the stone, an automatic power controller is utilized consisting of a meter with relay contacts. The meter measures the current flowing to the main power motor for the wire saw which drives the wire. When this current falls below a selected value, the meter through the relay means turns on a slow speed wire saw dolly feed down motor which down feeds the wire into the stone. This increases wire cutting pressure and restores wire bow to the optimum degree for efficient and rapid cutting. The increase in wire pressure and resulting drag increases current consumption to the main wire saw drive motor. When this current is increased to its original value, the meter turns off the slow speed down feed motor for the dolly.

7 Claims, 5 Drawing Figures

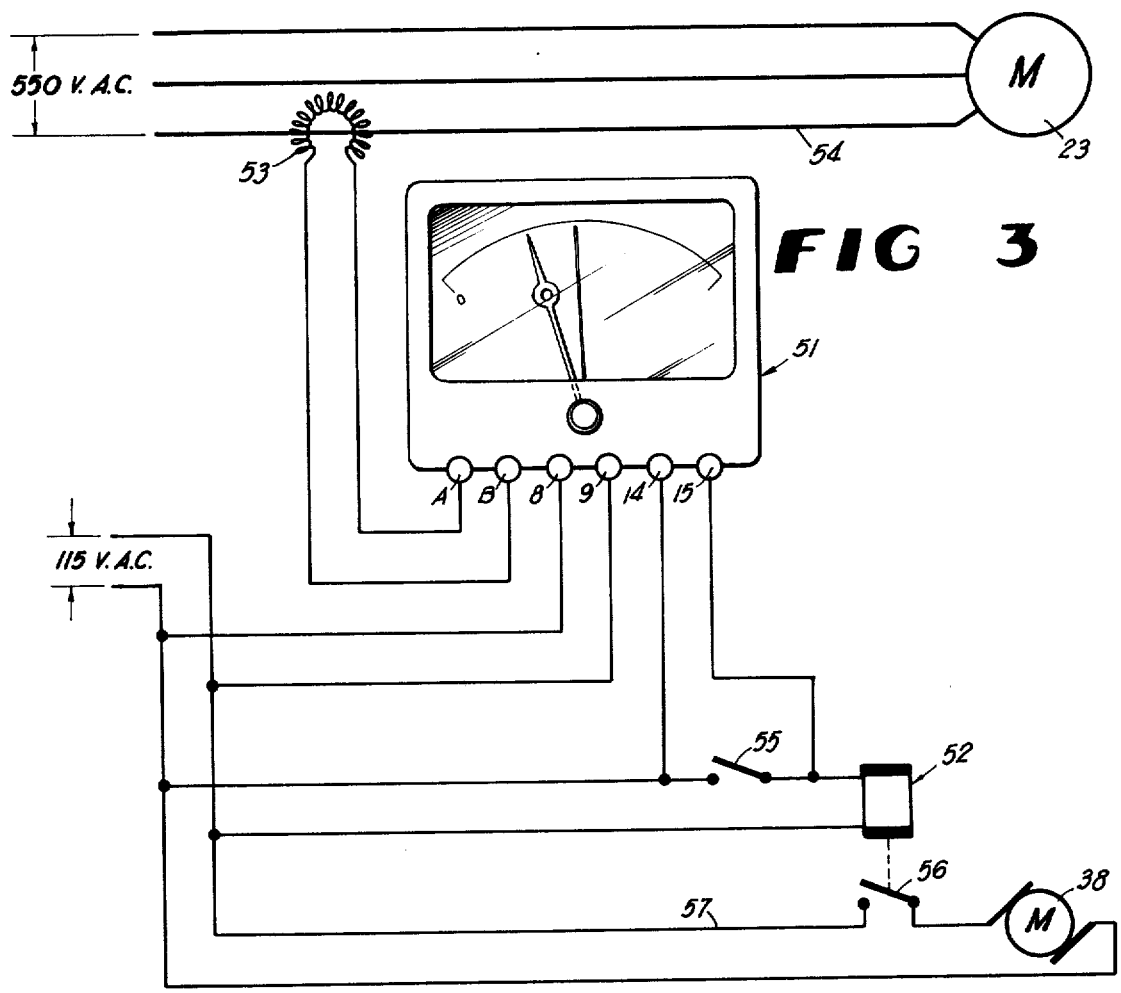
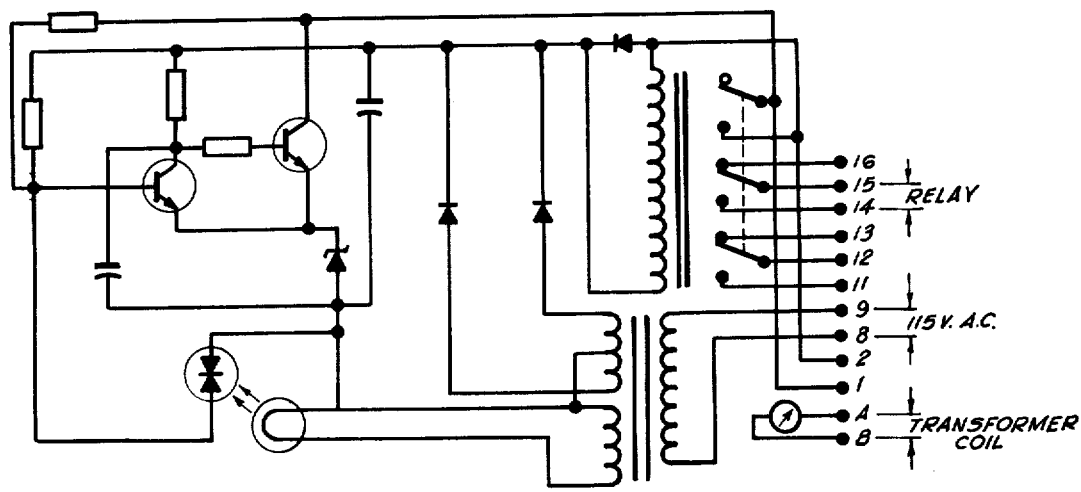

AUTOMATIC POWER CONTROLLER FOR A WIRE SAW

BACKGROUND OF THE INVENTION

Heretofore, in the art of stone cutting by means of a power-operated wire saw, no method for automatically controlling the main saw motor load has been known. The only available means of control have been mechanical feeds of various types which do not regulate the motor load. These prior art control devices do not adjust the sawing for constant horsepower, and therefore yield less cutting and rougher cutting.

The objective of this invention is to satisfy the need of the prior art to maintain the load on the main wire saw constant. If this load is constant, the resulting sawing is improved both in quantity and quality.

The invention utilizes a commercially available meter controller having internal switching contacts which are adjustable to close or open at a setting determined by the position of a meter control knob. The meter is set to a certain motor current value, usually ninety percent of the main motor's maximum current. The meter will then hold this value by down feeding the wire dolly whenever the motor current falls below the set value due to relaxing of the bowed cutting section of the wire. When the dolly down feed returns the proper bow curvature and cutting pressure to the wire, the load on the main drive motor and the motor current being drawn will return to the original preset value and the meter through its relay contacts will turn off the drive of the dolly.

The invention can be utilized on a wide range of saw types such as single wire strand saws or multiple wire saws. The meter controller is easily installed by disconnecting one power lead to the main saw drive motor and slipping a current transformer coil over the lead and reconnecting it. The meter controller turns on the wire dolly down feed motor whenever the power used by the wire driving motor decreases to a value below the preset optimum. The automatic power controller is simplified, economical, easy to adjust and yields increased sawing with improved quality.

BRIEF DESCRIPTION OF THE DRAWINGS

FIG. 3 is a schematic view of the automatic power controller embodying the invention.

FIG. 4 is a schematic view showing the internal circuitry of a commercial meter controller employed in the invention.

DETAILED DESCRIPTION

Figure 1A:
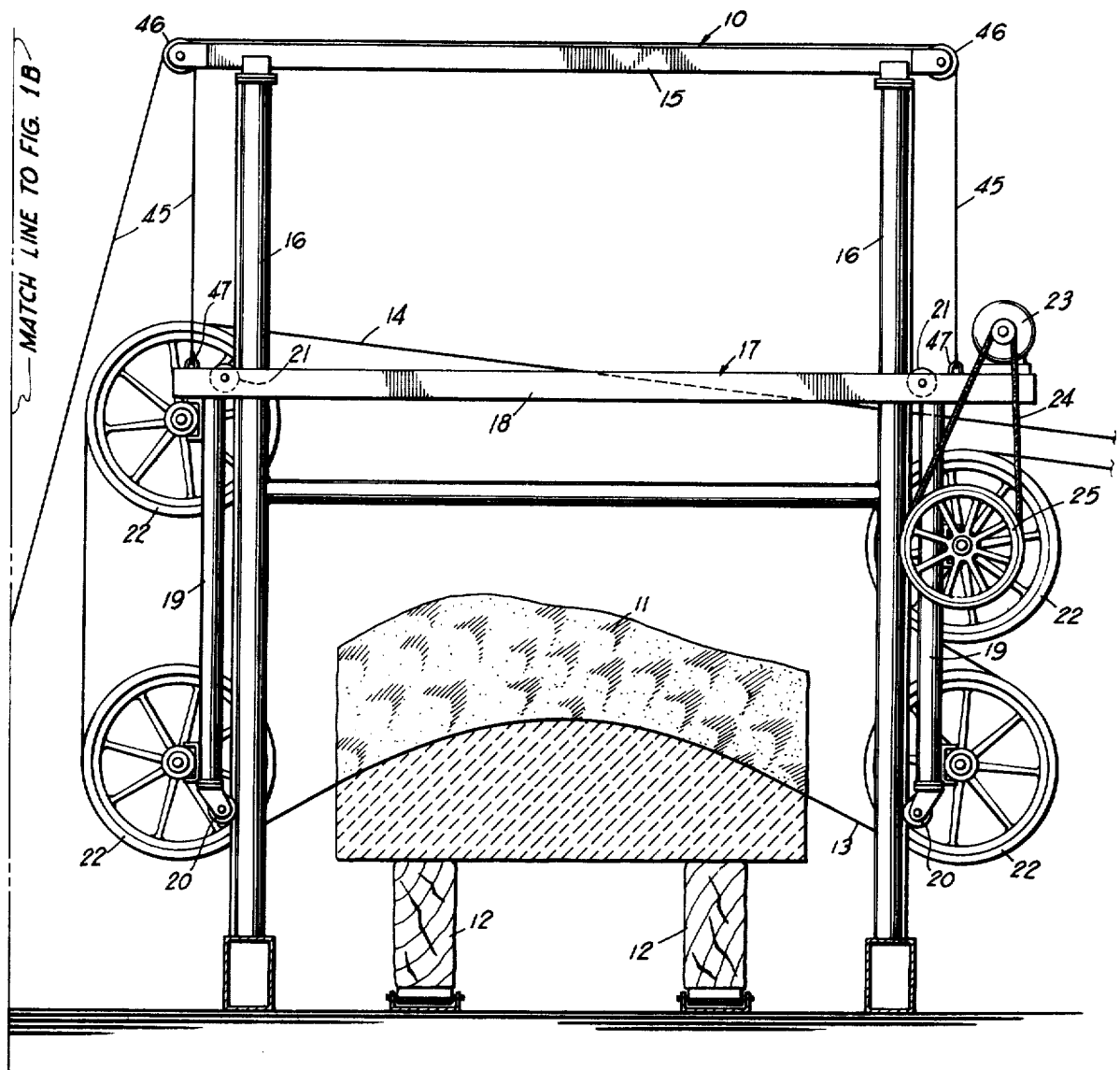
FIG. 1A is a side elevation of a wire saw equipped with the automatic power controller embodying the invention.

Referring to the drawings in detail, wherein like numerals designate like parts, the numeral 10 designates a wire saw for cutting a stone slab 11 or the like suitably supported at 12 beneath a bowed cutting portion 13 of a convoluted sawing wire 14.

The wire saw 10 comprises a main frame 15 having side uprights 16 on which a dolly 17 for the sawing wire 14 moves vertically relative to the stationary stone 11. The dolly has an upper cross frame member 18 connected with vertical legs 19 having lower and upper guide rollers 20 and 21 thereon in rolling contact with the two main frame uprights 16.

Journaled and supported on the dolly 17 are pulley wheels 22 for the support and guidance of the sawing wire 14 in a conventional manner. This wire is driven in one direction to saw through the stone 11 by a main drive motor 23 on dolly frame member 18, and associated transmission gearing 24 coupled with the shaft 25 of the adjacent wire driving pulley 22.

Means, not shown in the drawings, delivers a slurry of water and abrasive material onto the sawing wire and/or stone to abrade the stone and accelerate the sawing action.

For most efficient and rapid stone cutting, a constant cutting pressure on the stone 11 must be maintained by the cutting portion 13 of the wire and this pressure causes an optimum bowing of the wire as shown in FIG. 1 which must be maintained. As the cutting wire descends through the stone slab 11, its bow curvature tends to flatten out with a resulting reduction in cutting and cutting pressure and the dolly 17 must be fed downwardly to restore the proper degree of bow to the wire portion 13. The diminishing of the bow curvature of the wire during cutting and the lessening of the cutting drag on the wire lessens the load on the main wire driving motor 23 and reduces the amount of current drawn by this motor. The automatic power control means of the invention, to be described, functions to maintain a constant load on the main motor 23 and thus a constant amount of current flowing to the drive motor. To do this, the control means responds to a reduced load on the motor 23 and a drop in current drawn by this motor to cause down feeding of the dolly 17 with a resultant restoration of the bow curvature in wire portion 13 with increased pressure and drag, to thereby elevate the load on the motor 23 to the normal preset value and to return its current consumption to normal.

Figure 1B:
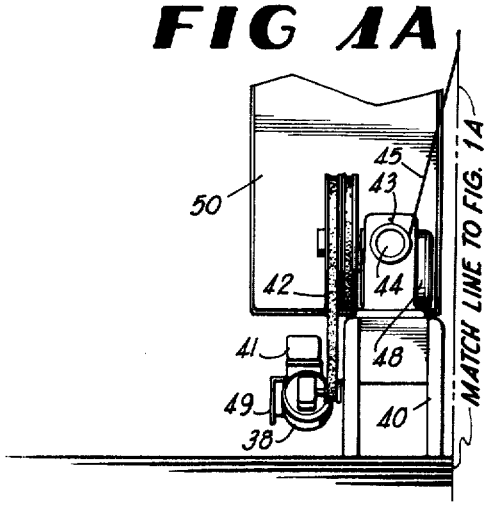
FIG. 1B is a fragmentary elevational view of a wire dolly feed down motor means mounted near one side of the wire saw.
Figure 2:
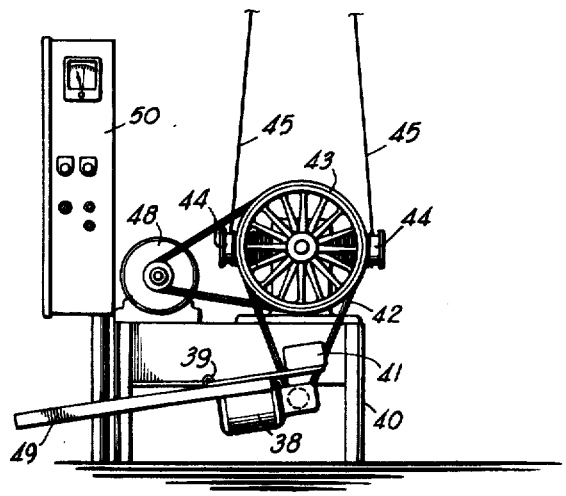
FIG. 2 is a side elevation of the means shown in FIG. 1B taken at right angles thereto.

The down feed means for the wire transport dolly 17 is shown in FIGS. 1B and 2 and comprises a support stand 40 mounted near one side of the main frame 15. This stand serves to mount a slow speed dolly down feed motor 38 which is hinged to the stand 40 at 39. The motor is counterweighted at 41 to maintain active transmission gearing 42 between the motor 38 and a gear head winch 43, also on the stand 40, having a pair of drums 44 which turn in unison to pay out a pair of suspension cables 45 for the dolly 17, these cables being wrapped oppositely on the drums 44. The cables 45 are trained over pulleys 46 at the top corners of frame 15 and are attached to opposite sides of the dolly 17 as shown at 47.

The gear head winch 43 also has an alternate high speed drive 48 on the stand 40 which comes into play only when a foot pedal 49 is depressed to pivot the slow speed motor 38 around the axis of hinge mounting 39 to slacken and deactivate the slow speed drive 42. The high speed drive is turned on in such cases as for elevating the dolly 17 rapidly or for lowering it rapidly from an overhead position toward the stone to be cut. The automatic power controller of this invention is concerned only with the slow speed dolly feed down motor 38 and the main drive motor 23 of the wire saw. The stand 40 also serves to support a housing 50 for the automatic power controller, now to be described.

Referring to FIG. 3, the main wire saw drive motor 23 and its AC supply is shown along with the slow speed dolly feed down motor 38 and its AC power supply. A commercially available meter relay unit 51 of a type manufactured and sold by Simpson Instruments, 853 Dundee Ave., Elgin, Ill. 60120, is employed in the invention to measure the current flowing to the main motor 23 of the wire saw. When this current falls below a selected value, customarily 90 percent of the motor's maximum rated current, a built-in relay 52 of the meter 51 will turn on the slow speed dolly down feed motor 38 which, through the winch means 43 and 44 and cables 45, will lower the dolly 17 and restore the optimum degree of bow in the saw wire portion 13. The resulting increased pressure and drag on the wire portion 13 will increase the load on the main drive motor 23 and will increase the motor current to the original preset value. This motor control operation is performed automatically by the Simpson motor-load meter relay unit or an equivalent control means.

As the wire 13 cuts downwardly through the stone 11 and loses some of its bow curvature and its pressure against the stone and drag are lessened, the load on motor 23 is correspondingly lessened and the motor current being measured by the meter 51 drops from the optimum value. It is this drop which activates the control instrument initially, as described, and causes a substantially constant load to be maintained on the motor 23 during continuous operation of the wire saw automatically. The control system is sufficiently sensitive so that in practice, when the desired current value to the motor 23 is preset with a control knob on the instrument 51, the current to the motor 23 and its load will be maintained nearly constant at all times so that the bow of the wire portion 13 and its drag and cutting pressure will be nearly constant, which is the purpose of the invention, to assure the most efficient and economical cutting or sawing.

A sensor or transformer coil 53 constituting a conventional part of the meter 51 is slipped over one power lead 54 going to the main drive motor 23. The coil 53 is not directly or physically in contact with the lead 54. The coil acts as a transformer in conjunction with the AC ammeter 51.

A manual on-off switch 55 is provided on the control meter-relay instrument and the built-in power relay 52 has contact means 56 connected in the power supply line 57 to the 115 volt AC slow speed dolly feed down motor 38.

FIG. 4 shows the internal circuitry for the described Simpson meter 51 with built-in control relay 52 and since the instrument is conventional and commercially available, the circuit need not be described in detail. The instrument terminals A and B connected with the transformer coil 53 are indicated in both FIGS. 3 and 4. The built-in relay terminals 14 and 15 in FIG. 4 are also identified in FIG. 3 as well as the 115 volt power terminals 8 and 9 connected with the meter 51. It is believed that the purpose and mode of operation of the Simpson meter-relay unit 51–52, as employed in connection with the two electric motors 23 and 38 of the wire saw and dolly, may now be fully understood for purposes of the invention without further description. The automatic power controller embodied in this instrument constantly measures current flowing to the main wire saw motor 23 and when the current value falls below the desired value due to slackening of the wire portion 13, as explained, the slow speed feed down motor 38 for dolly 17 is turned on automatically. This quickly restores the proper bow and tension to the wire 13 and the resulting increased load on the motor 23 returns the current consumption of this motor to the normal selected value automatically. When the main motor current is increased to its original value, the meter through its relay 52 turns off the dolly feed down motor 38.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. In a wire saw having a support frame, a dolly for transporting a cutting wire movably mounted on the support frame, a cutting wire driving motor on the dolly, and a feed down motor means for the dolly, an automatic power controller comprising:
   a current measuring meter electrically coupled with said cutting wire driving motor to constantly measure the current flowing to said motor, said current measuring meter including a relay having an electrical contact coupled with said dolly feed down motor means and responsive to a decrease in the measured current to the cutting wire driving motor, resulting from a lessening of a load on the cutting wire driving motor due to reduced cutting pressure and drag on the cutting wire for turning on said dolly feed down motor means until normal cutting pressure and drag is restored to said wire and the load and current of the cutting wire driving motor are returned to normal values.

2. The wire saw recited in claim 1, wherein said current measuring meter is coupled to the cutting wire driving motor through an induction coil slipped over a power supply lead of the cutting wire driving motor.

3. The wire saw recited in claim 1, wherein said cutting wire driving motor and said feed down motor means for the dolly have different operating voltages, and the coil of said power relay is electrically coupled to the power supply line of the feed down motor means and also electrically coupled with the current measuring meter.

4. The wire saw recited in claim 3, wherein said current measuring meter includes a plurality of terminals electrically coupled to the power supply line of said feed down motor means for the dolly.

5. The wire saw recited in claim 1, wherein said power relay comprises an integral part of said current measuring meter.

6. The wire saw recited in claim 5, wherein said current measuring meter is an AC ammeter.

7. The wire saw recited in claim 1, wherein said feed down motor means for the dolly comprises an electric motor operated power winch including movable suspension cable means connected to and supporting said dolly for movement.

* * * * *